(12) United States Patent  
Siri (10) Patent No.: US 8,515,152 B2  
(45) Date of Patent: Aug. 20, 2013

(54) PROCESS AND SYSTEM FOR ANALYZING DEFORMATIONS IN MOTOR VEHICLES

(75) Inventor: Fausto Siri, Mele (IT)

(73) Assignee: Fausto Siri (IT)

( * ) Notice: Subject to any disclaimer, the term of this patent is extended or adjusted under 35 U.S.C. 154(b) by 1262 days.

(21) Appl. No.: 11/579,934

(22) PCT Filed: Mar. 25, 2005

(86) PCT No.: PCT/EP2005/051400  
§ 371 (c)(1), (2), (4) Date: May 12, 2008

(87) PCT Pub. No.: WO2005/109263  
PCT Pub. Date: Nov. 17, 2005

(65) Prior Publication Data  
US 2008/0267487 A1 Oct. 30, 2008

(30) Foreign Application Priority Data  
May 11, 2004 (IT) .............................. SV2004A0021

(51) Int. Cl.  
*G06K 9/00* (2006.01)

(52) U.S. Cl.  
USPC .......................................................... 382/141

(58) Field of Classification Search  
USPC ......................................................... 382/141  
See application file for complete search history.

(56) References Cited

U.S. PATENT DOCUMENTS

| | | | | |
|---|---|---|---|---|
| 5,341,575 A * | 8/1994 | Chisum | ........................... | 33/608 |
| 5,377,098 A * | 12/1994 | Sakai | .............................. | 705/29 |
| 5,504,674 A * | 4/1996 | Chen et al. | ........................ | 705/4 |
| 5,839,112 A * | 11/1998 | Schreitmueller et al. | ......... | 705/4 |
| 6,226,418 B1 * | 5/2001 | Miller et al. | ................... | 382/294 |
| 6,408,107 B1 * | 6/2002 | Miller et al. | ................... | 382/294 |
| 6,633,686 B1 * | 10/2003 | Bakircioglu et al. | ......... | 382/294 |
| 2002/0161533 A1 * | 10/2002 | Uegaki | .............................. | 702/35 |
| 2009/0138290 A1 * | 5/2009 | Holden | .............................. | 705/4 |

FOREIGN PATENT DOCUMENTS  
EP 1204060 A1 * 5/2002

* cited by examiner

*Primary Examiner* — Roy M Punnoose  
(74) *Attorney, Agent, or Firm* — Kramer Levin; Naftalis & Frankel LLP (57) ABSTRACT

A process for identifying, analysing and estimating deformations in motor vehicles is presented. The process includes loading image data relevant to at least a three-dimensional image of a damaged vehicle in memory, calling up image data of a sample vehicle from a database of sample vehicle images, the sample vehicle image corresponding to the damaged vehicle type, displaying image data relevant to the damaged vehicle image and the corresponding undamaged sample image, comparing the respective images to identify damage location or deformation and detecting deformed regions, computing at least one of area and volume of damaged or deformed region(s), and identifying the location in space of the damage on the vehicle using a defined algorithm and the results of said comparison.

35 Claims, 10 Drawing Sheets

PROCESS AND SYSTEM FOR ANALYZING DEFORMATIONS IN MOTOR VEHICLES

CROSS REFERENCE TO RELATED APPLICATIONS

This application is the United States national stage filing of corresponding international application number PCT/EP2005/051400 filed on Mar. 25, 2005, which claims priority to and benefit of Italian application number SV 2004 A 000021, filed May 11, 2004, each of which is hereby incorporated herein by reference.

CROSS-REFERENCE TO RELATED APPLICATIONS

The present application is the U.S. national stage filing of corresponding international stage application number PCT/EP2005/051400, filed on Mar. 25, 2005, which claims priority to and benefit of Italian application number SV 2004 A 000021, filed May 11, 2004, each of which international application and Italian application are hereby incorporated herein by reference.

TECHNICAL FIELD

The present invention relates to a process for identifying, analyzing and estimating deformations, particularly in motor vehicles.

BACKGROUND OF THE INVENTION

Conventionally, processes of the above mentioned type are known and widely used. Although these processes accomplish their function in a satisfying manner, they have various drawbacks. According to such prior art processes, when it is necessary to have an estimation of damage to a motor vehicle's body and/or structural parts it is necessary to apply to a skilled estimator, who, by carrying out first a visual estimation of the damage, estimates parts to be repaired, parts to be replaced, and with reference to suitable schedules, evaluates the time and cost needed for repairing the damage.

This type of estimation is highly subjective, and depends upon the experience of the skilled estimator person using schedules. This often results in a given damage estimate, both as regards time and cost, often being different between two such experts having different experience. Thus, some of said schedules generally provide a range of time values necessary to repair one motor vehicle part, where said times can range from a minimum to a maximum; the final value selection is thus assigned to the person skilled in the art on the basis of his experience.

Another drawback of prior art systems is due to the fact that a really precise estimation of damage, and of parts affected by the damage, is extremely time-consuming. For example, in a motor vehicle, it is necessary to estimate (i) the depth of the damage and (ii) whether the damage has affected any structural elements of the motor vehicle, and to what extent. For example, in the case of damage to the side of an automobile, it is necessary to identify not only the macroscopically damaged parts, such as, for example, doors, but it is also necessary to identify whether the damage has affected any internal mechanical parts of such doors, including frame stanchions, anti-intrusion bars, or other parts. In order to have a precise budget it is also necessary to consider the time for assembling and disassembling affected parts and/or equipment related thereto, in addition to the time strictly necessary for repairing/replacing the actually damaged parts.

Because of these reasons, conventional systems for identifying and estimating vehicle damage are often not only expensive, but also inaccurate as regards the result, often differing from the final time and costs needed for the repair. Inaccuracy also occurs in estimation errors by the skilled estimator, as he estimates the damage subjectively, for example, where he provides for replacing a part where it would have actually been more economical to repair ft.

The present invention aims to provide a process for identifying, analyzing and estimating deformations particularly in motor vehicles that can overcome, in a simple and inexpensive way, these and other drawbacks of known systems and devices for locating deformations and estimating the seriousness of such deformation.

SUMMARY OF THE INVENTION

Exemplary embodiments of the present invention achieve the above aims with a process for identifying, analyzing and estimating deformations, particularly in motor vehicles, wherein such deformation and damaged region estimation is carried out in a objective manner.

An advantageous exemplary embodiment of a process and system according to the present invention can include: (i) manually, automatically or semi-automatically selecting the damaged vehicle body region, (ii) computing perimeter, area and/or volume of the deformed or damaged region by means of a program comprising suitable algorithms, also (iii) identifying also various vehicle parts affected by deformation, (iv) computing a time/cost repair estimate, and (v) comparing it to replacing time/cost of individuals parts, choosing the more suitable time/cost.

In particular, such manual selection can include: (i) providing a database of sample vehicle images, i.e. of non-damaged vehicles; (ii) calling up in a vehicle image memory a sample vehicle image corresponding to the damaged vehicle, from the database of sample vehicle images; (iii) displaying said image on a monitor; (v) selecting on the displayed vehicle image the regions corresponding to the deformed or damaged regions of the damaged vehicle inputting graphic and/or alphanumeric commands by means of graphic and/or alphanumeric command input means; (v) entering graphic and/or alphanumeric commands via input means alternatively or in combination: (a) a quality and/or quantitative estimation of degree of deformation depth proportional to seventy of deformation, (b) computing perimeter, area and/or volume by means of algorithms implemented by the program, and (c) identifying the spatial location of the damage on the vehicle.

In embodiments using automatic or semi-automatic selection, the following can be alternatively included: (i) loading in a vehicle image memory a three-dimensional image of the damaged vehicle, (ii) calling up in the image memory of a three-dimensional image of the sample vehicle from the database of sample vehicle images, said sample vehicle image corresponding to the damaged vehicle image; (iii) comparing the three-dimensional image of the damaged vehicle with the corresponding sample vehicle three-dimensional image by comparing said two images, (iv) identifying the location of the damage or deformation and detecting any deformed regions; (v) storing the results of said comparison in program memory; (vi) computing perimeter, area and/or volume by means of algorithms implemented by the program, and/or identifying the spatial location of the damage on the vehicle using a computation algorithm on the deformed regions and/or on the results of said comparison stored in memory.

In a first preferred embodiment, in the manual selection mode, the operator can display on a monitor a two-dimensional, or preferably a three-dimensional, image of the damaged vehicle calling it up by choosing from the data bank of sample vehicle images. The three-dimensional image can be such that each point or small region (comparable to a spot-like region) of vehicle surface has three coordinates. In this first preferred embodiment, by means of graphic and/or alphanumeric data or command input means, such as, for example, a keyboard, a mouse or a pointing device, the operator can draw a vehicle region on the image shown in the monitor, particularly the region affected by damage or deformation. Thus the selection regards a two-dimensional size, therefore an area, since the selection is made on monitor on a picture that is necessarily two-dimensionally displayed. Subsequently, the operator can enter an estimation damage parameter, that can be a quality estimation (low, medium, high), or, for example, can be a quantitative estimation (for example introducing damage depth in cm).

The program can then compute the area of the surface indicated by the operator as the deformed or damaged surface, and eventually it can further compute volume using the quantitative/quality estimation entered by the operator. In the case of quality estimation of low/medium/high type the program can identify predetermined estimation depth range and use an average value for computing volume affected by the deformation.

Identification of the damaged or deformed region can, for example, be even carried out in a semi-automatic way: in this case the operator enters a three-dimensional image of damaged vehicle in the virtual image memory and calls up from the data bank of sample vehicle images the three-dimensional image of a corresponding not damaged or deformed vehicle. The program can compare three-dimensional images of the two vehicles and determine the regions in which the two images are different by means of a known technique for comparing three-dimensional images. Thus, the program obtains by comparison the deformed region of the damaged vehicle, computing size, area and eventually volume, that is the deformation depth and its distribution on the deformed surface, identifying also the spatial location of the deformation as regards parts constituting the vehicle.

According to a further preferred embodiment the identification and estimation of the damaged or deformed region can be carded out automatically. In this case the system can have a scanning unit for scanning a vehicle, such as, for example, an optical scanner, laser scanner or the like. The scantling unit can detect the three-dimensional image of the damaged vehicle in the form of an image data array in three-dimensions, wherein each point has three space coordinates, and said three-dimensional image of the damaged vehicle is stored in the virtual image memory unit for the damaged vehicle. The program, stored for example in a program memory unit, can call up the virtual vehicle image that is more similar to the damaged one from three-dimensional or virtual image database of sample vehicles, eventually asking for confirmation by an operator by a suitable message. Once the confirmation of the correct image selection of sample vehicle is obtained, if necessary, the program compares the damaged vehicle virtual image with the corresponding virtual or three-dimensional image by means of known criteria for comparing three-dimensional images, thus estimating size, area and eventually volume of the deformed or damaged region.

Whether the identification takes place manually, semi-automatically or automatically, after identification according to above mentioned methods, an exemplary system according to the present invention has stored in memory a size, area and volume of damaged regions of a specific vehicle type.

From there an exemplary system goes on automatically, eventually asking an operator only for confirmations, to identify various vehicle parts affected by damage or deformation. For instance, in the case of a damage or deformation detected on a vehicle side part, the system provides for identifying whether damage has affected (i) one or both doors, (ii) front/rear wheelhouse/wheelhouses, (iii) stanchions, (iv) door handles, (v) hinges, (vi) window glass, etc.

Once the system has determined and identified vehicle parts affected by damage or deformation, by estimating severity of deformation it assigns to each deformed part a degree of deformation severity. For each deformed or damaged part the system can to compute cost and operations needed for rebuilding the part by comparison with a database of time and cost motor vehicle parts.

In particular, the system compares the deformed part with a similar part in the time/cost repair database, providing, for example: time/cost of sheet metal working, painting and piece assembling/disassembling steps regarding the degree of deformation severity. More particularly it is evident that cost and time of a sheet metal worker repairing a specific body part is highly related to the damage suffered by the part, identified by the system by degree of severity. For each deformed or damaged piece it is necessary to provide piece disassembly, sheet metal repair (i.e. sheet metal working), piece painting and subsequent reassembly of the piece on the vehicle. Disassembling time also includes possible (unaffected) parts to be disassembled and reassembled in order to gain access to said deformed or damaged piece, even if it is not part of that piece itself.

Next, for example, the system can for each vehicle part, compare reparation cost (inclusive of disassembly/reassembly, sheet metal working, spare part painting and various expendable materials as above) with the cost for replacing the damaged part with a new part. Therefore, the system can estimate by comparison of time and costs of the two repair types, i.e. repairing or replacing the part. Alternatively it can suggest two solutions to the operator (by monitor or print results) or it can itself choose according to criteria for comparing and selecting the lowest value, that is an economically more suitable value.

Example systems according to the present invention can further provide that a CPU can have direct access to a spare part warehouse database of the repair shop where the repair takes place, and thus identify whether parts needed for repair are available, or whether they have to be ordered. Therefore the system can produce, on monitor or by printer, a result report that can be automatically sent to spare part suppliers, by paper or electronically, for example by e-mail, to eventually order missing parts that are necessary for repairing the damaged vehicle.

Therefore the system according to the present invention can carry out an identification of damaged regions of a vehicle and an highly accurate and objective time/cost budget, because such comparison and computation is carried out directly by comparing the damaged vehicle and an equivalent sample undamaged or deformed vehicle.

On the basis of damaged area depth the system can further advantageously identify parts to be repaired, even if they are inside the vehicle and therefore not visible, with a definite improvement not only in budget accuracy, but also in the time needed for drafting such a list. Hence, with a system according to the present invention it is not necessary to visually identify inner damaged parts, such as is commonly done conventionally but it is sufficient to have a qualitative or quantitative estimation of damage depth.

Advantageously according to the present invention it is further possible to provide that the system, in the manual damage identification mode, can be available, for example, via Internet, in an interactive way: it is thus possible for a user acting as described above to carry out an estimation directly via personal computer as regards time/cost of damage of his own vehicle, simply by selecting the damaged region and giving an estimation of damage severity, namely its depth.

Thus, advantageously possible disputes with insurance companies or with manufacturers and repair shops can be even eliminated or reduced as regards for damage estimation.

Further features and improvements are the object of the description and claims provided below.

BRIEF DESCRIPTION OF THE DRAWINGS

Features of the invention and advantages derived therefrom will be more evident from the following detailed description of detailed figures, in which.

DETAILED DESCRIPTION OF THE INVENTION

Figure 1:
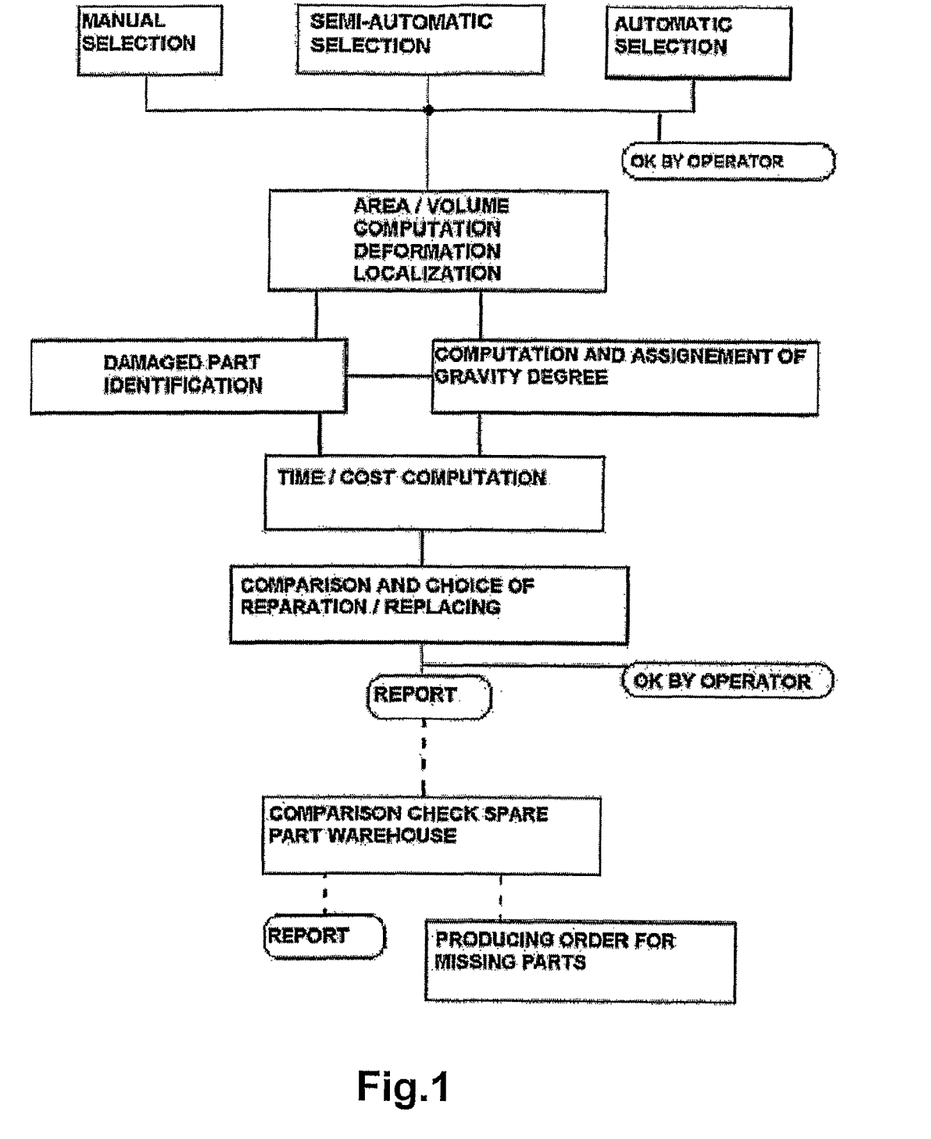
FIG. 1 is a flow diagram of operations carried out by an example system and process according to the present invention.

FIG. 1 shows steps carried out according to the process of the present invention to achieve identification, analysis and estimation of deformations particularly in motor vehicles. As noted, it is possible to act according to three preferred selection modes for selecting the deformation: manual selection, semi-automatic selection and automatic selection.

The manual selection mode can include: (i) providing a database of sample vehicle images, i.e. of non-damaged vehicles; (ii) calling up in a vehicle image memory a sample vehicle image corresponding to the damaged vehicle. Thorn the database of sample vehicle images; (iii) displaying said image on a monitor; (v) selecting on the displayed vehicle image the regions corresponding to the deformed or damaged regions of the damaged vehicle inputting graphic and/or alphanumeric commands by means of graphic and/or alphanumeric command input means; (v) entering graphic and/or alphanumeric commands via input means alternatively or in combination: (a) a quality and/or quantitative estimation of degree of deformation depth proportional to severity of deformation, (b) computing perimeter; area and/or volume by means of algorithms implemented by the program, and (c) identifying the spatial location of the damage on the vehicle.

Figure 2:
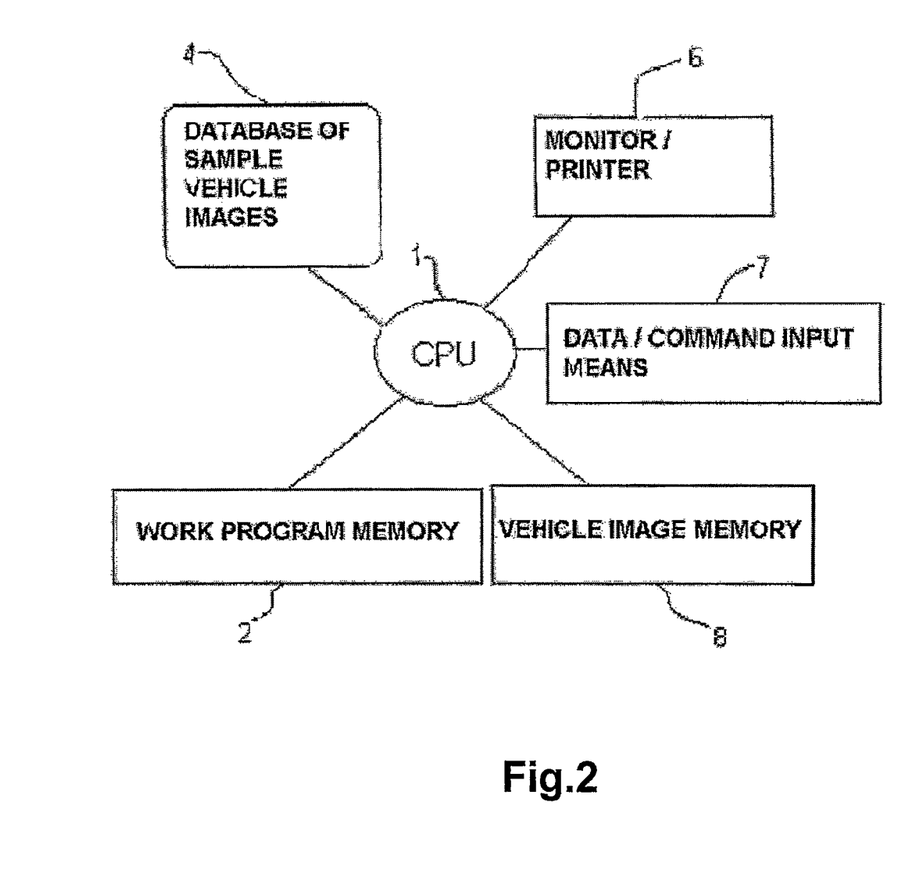
FIG. 2 shows system elements according to exemplary embodiments of the present invention required for semi-automatic, manual selection.

Elements that are preferably used for the manual selection are shown in FIG. 2 wherein it is possible to note: CPU or Central Processing Unit or central logical unit 1, memory of the work program 2 wherein the work program is loaded, data or command input means 7 such as keyboard, mouse, magnetic and/or optical readers, interface ports for external devices, vehicle image memory 8 wherein the vehicle image is stored; and a database, or data bank, of sample vehicle images 4 comprising at least a sample vehicle image. The estimation degree entered by the operator is proportional to the deformation depth In one or more points of the deformed or damaged region.

Figure 3:
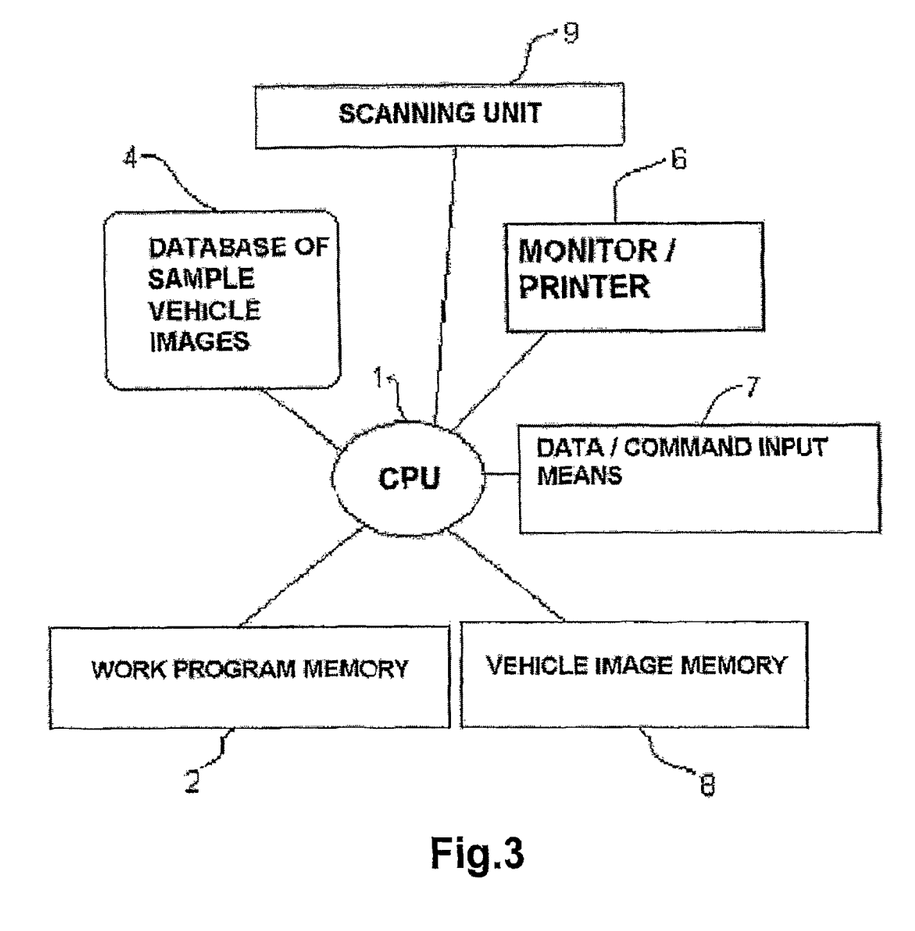
FIG. 3 shows system elements according to exemplary embodiments of the present invention for automatic selection.

Alternatively to the manual selection it is possible to provide a semi-automatic or automatic selection mode whose elements are shown in FIG. 2 as regards the semi-automatic selection and in FIG. 3 as regards the automatic selection.

In a semi-automatic selection the operator enters and loads in the vehicle image memory 8 a three-dimensional image of the damaged vehicle by means of data or command input means 7. Subsequently the operator calls up in the image memory for the damaged vehicle a three-dimensional image of a sample vehicle from the sample vehicle image database 4, said sample vehicle image corresponding to the damaged vehicle image, that is the two vehicles must be of the same brand, model and type. The program then compares the three-dimensional image of the damaged vehicle with the corresponding sample vehicle three-dimensional image identifying the localization of the damage or deformation and detecting deformed regions. Then the program stores the results of said comparison in the program memory and by means of various algorithms computes the area and/or volume, and/or identifies the spatial location of the damage to the vehicle using the computation algorithm on the deformed regions and/or on the results of said comparison stored in the work program memory. Thus, in the case of semi-automatic type selection, as shown in FIG. 2, the elements that are used are substantially the same as those used in the manual selection. However, in this case in order to advantageously compute the deformed or damaged region volume, it is preferable to use three-dimensional images, allowing the program to automatically compute the deformation depth in comparison with the corresponding three-dimensional image of the sample vehicle. In contrast, in the case of manual selection it is possible to use also two-dimensional images, as the deformation depth estimation is carried out by the operator, as described above.

In the case of automatic selection, elements shown in FIG. 3 are preferably used instead wherein it can be noted also a scanning unit 9 in addition to elements shown and described with reference to FIG. 2.

Figure 4:
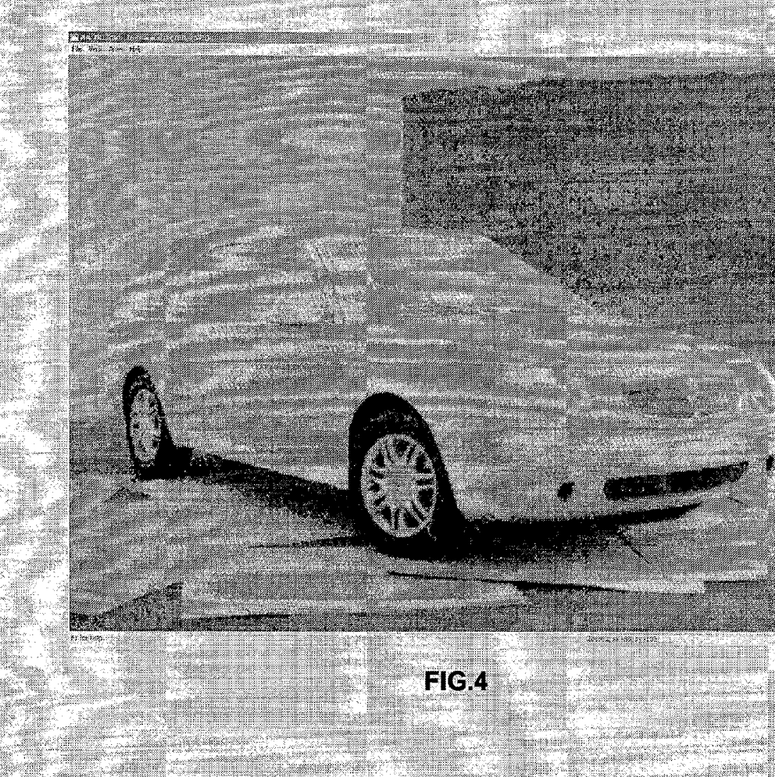
FIG. 4 is a sample vehicle.
Figure 5:
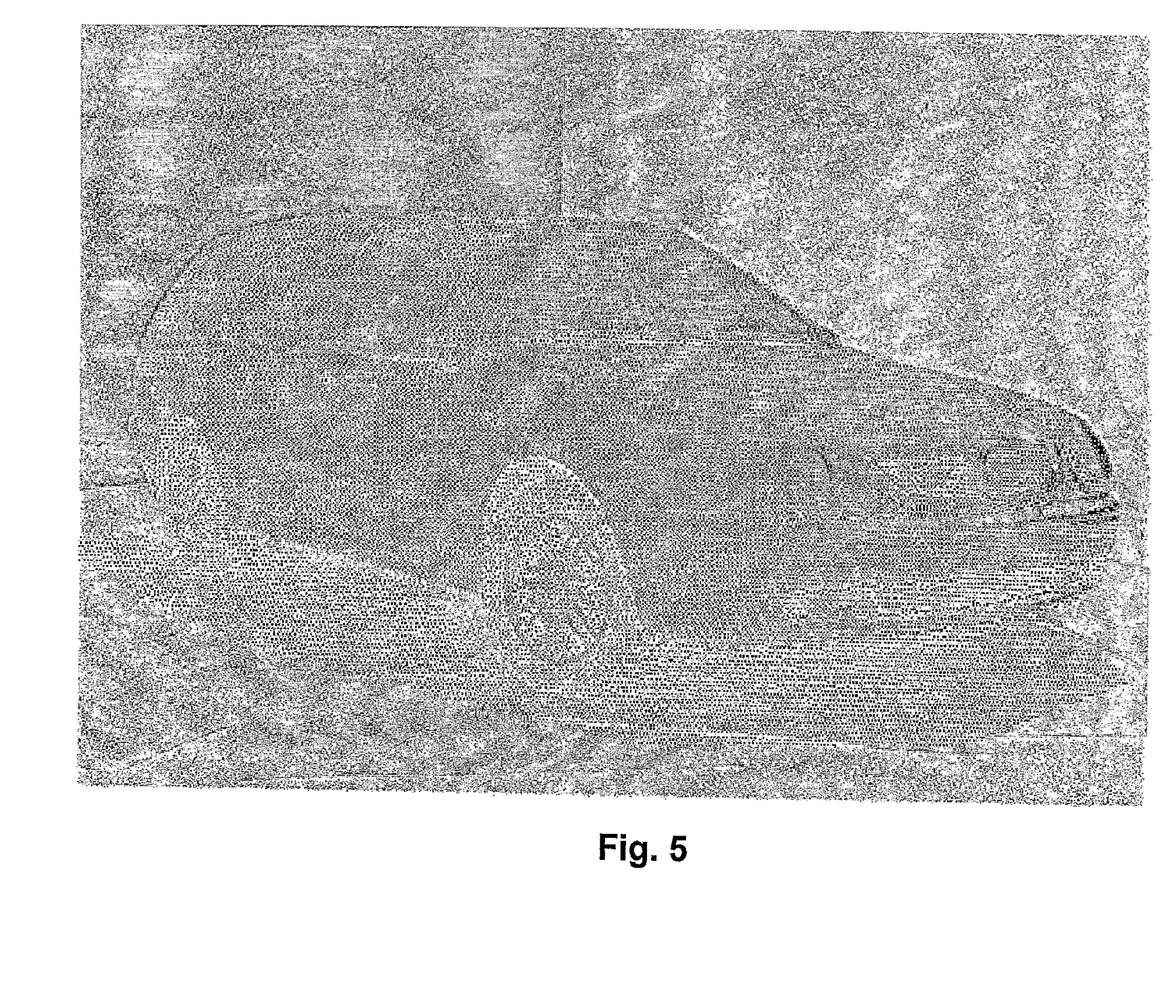
FIG. 5 shows scanning of the sample vehicle in three dimensions by points.
Figure 6:
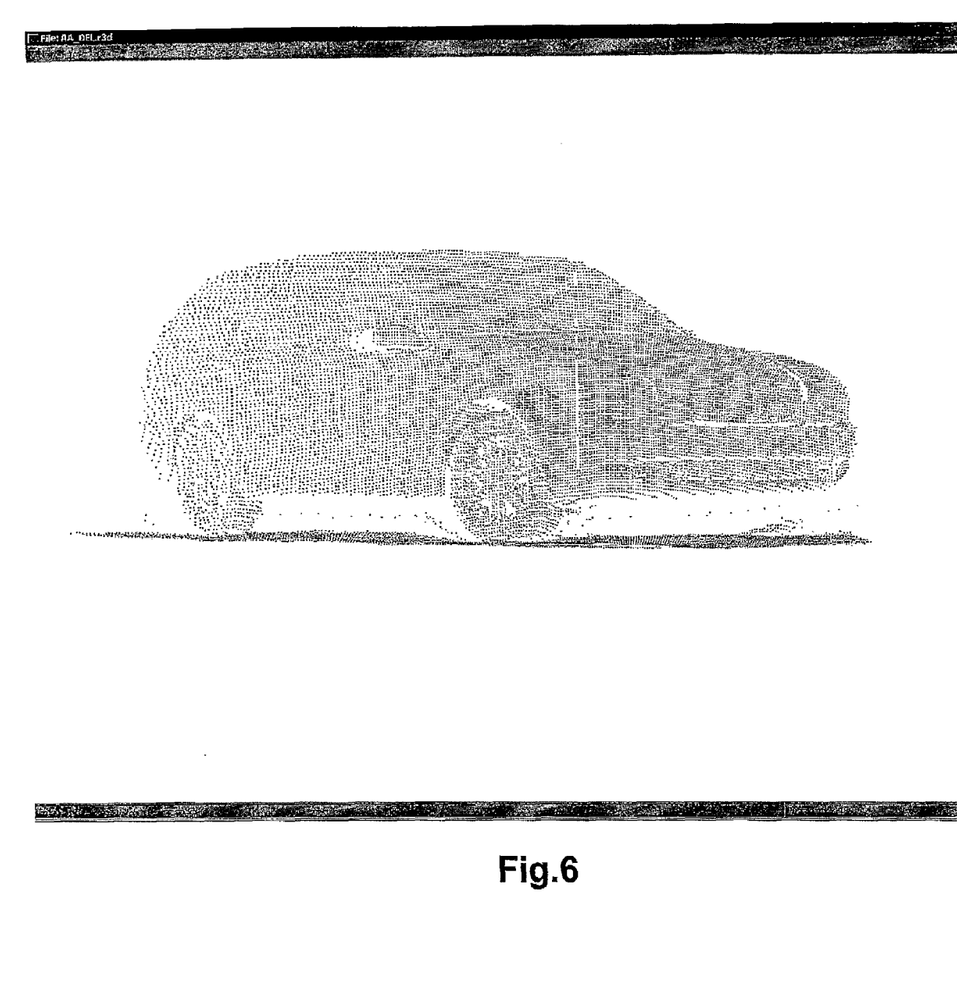
FIGS. 6 and 7 show a three dimensional image of the sample vehicle of FIG. 4.
Figure 7:
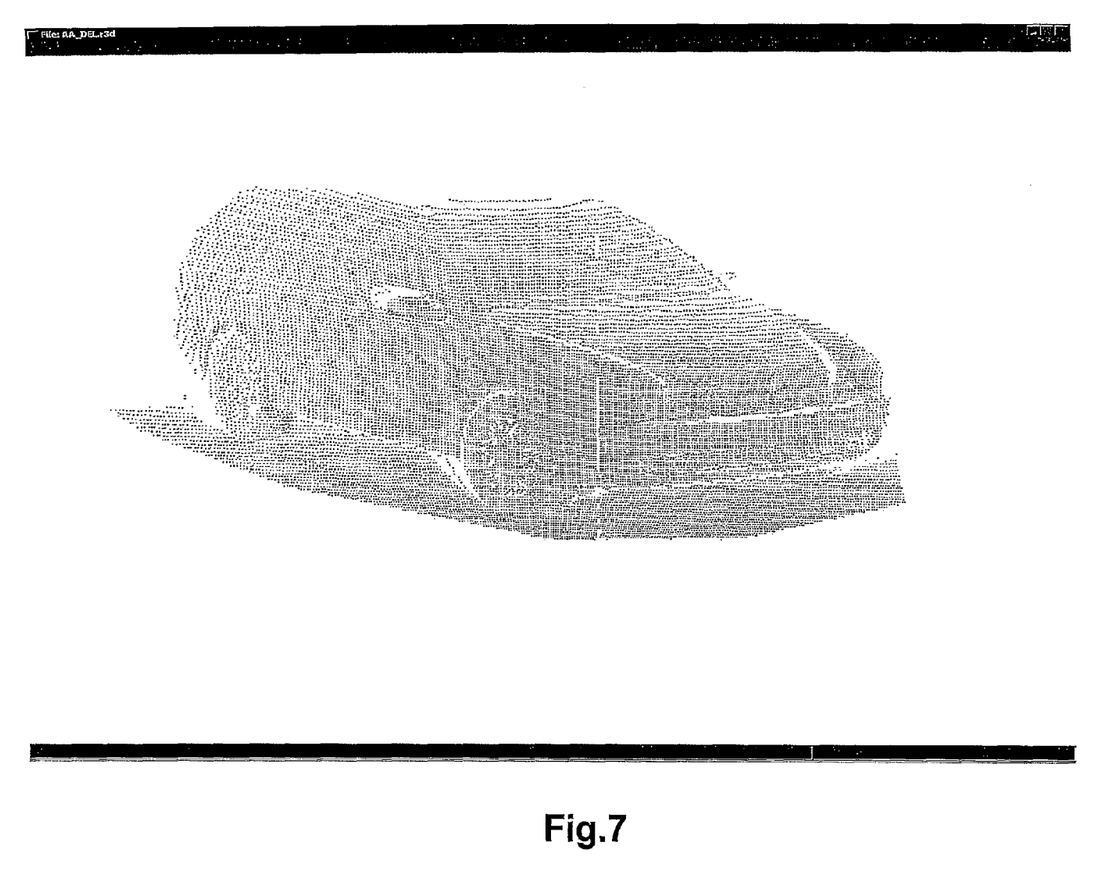
Figure 8:
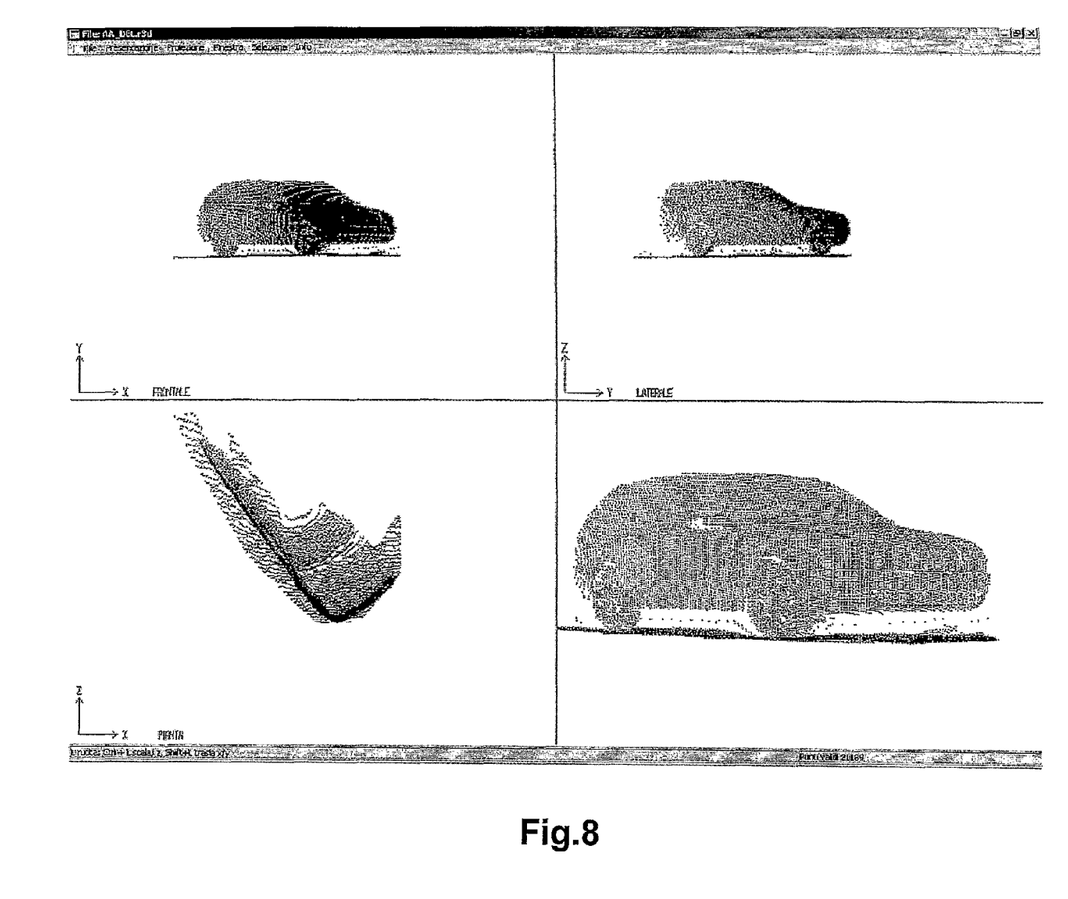
FIG. 8 is other views that can be obtained by the three dimensional image of the sample vehicle.

The operation of scanning unit 9 provides the scanning of a vehicle as shown in FIG. 4, preferably with a laser, resulting in an image data array or a three-dimensional image of a vehicle, that identifies points constituting the vehicle contour, such as is shown in FIG. 5. The three-dimensional image can be displayed as shown in FIG. 8 wherein different views of the same vehicle can be seen.

In the automatic mode selection the work program can compare the damaged vehicle image with all images of sample vehicle database, and can call up from the sample vehicle image database the three-dimensional image of the sample vehicle that by comparison corresponds much more in points with the damaged vehicle image. In the semi-automatic or automatic selection modes, once two images of the damaged vehicle and of the sample vehicle are present in vehicle memory, the program compares the three-dimensional images of the damaged vehicle and of the corresponding sample vehicle detecting points where a deformation or difference occurs.

Results of said comparison between damaged vehicle and sample vehicle images are then entered in the memory unit of the program, which, for each point and/or small area, identifies the deformation occurred, and computes perimeter, damaged region area and/or deformation volume and/or the deformation depth by means of known algorithms. Such algorithms for computing both areas and perimeters and volumes starting from a three-dimensional image of the object are known, such as those used in topographic scanners, such as the LEICA ADS 3000 system of LEICA company in combination with CYCLONE CLOUDWORKS 2.1 or 4.1 software, or for example the CYRAX 2005 system.

According to a preferred solution it is possible to provide that on program prompt the operator inputs an acceptance or denial for said sample vehicle chosen by the program and displayed on monitor, so as to have a confirmation of the automatic selection carried out by the program.

At the end of the definition/selection/computation of damaged or deformed areas and/or volumes, a size and/or an area and/or a volume of damaged regions of a particular type of vehicle can be stored in the work memory.

The program can be such that the CPU identifies by shapes various parts constituting a vehicle, and associates them to predetermined identification codes of vehicle parts, for example identifying whether the damage is on doors or on other different vehicle parts. According to the present invention an exemplary CPU can be provided to interact with a database of parts constituting the vehicle, each part being identified by a code.

Figure 9:
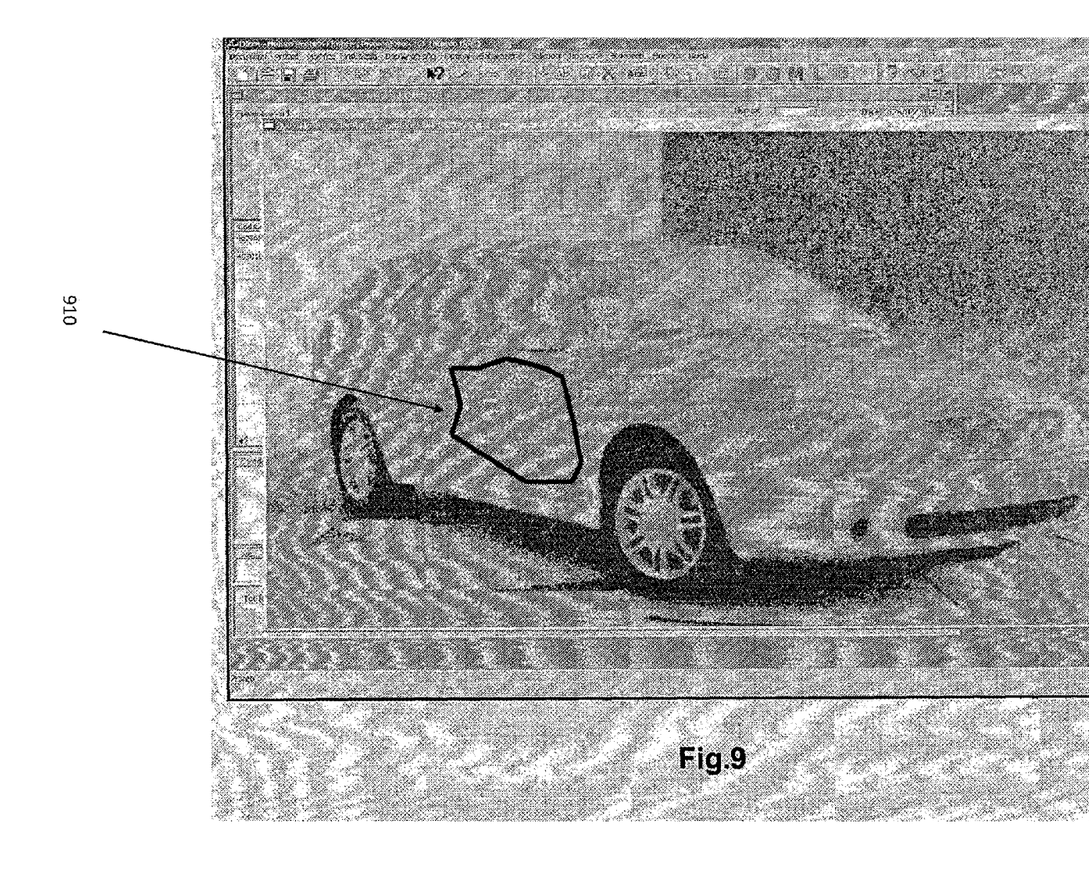
FIGS. 9 and 10 show two exemplary selections of deformed/damaged regions on exemplary three-dimensional images of an exemplary vehicle according to exemplary embodiments of the present invention.
Figure 10:
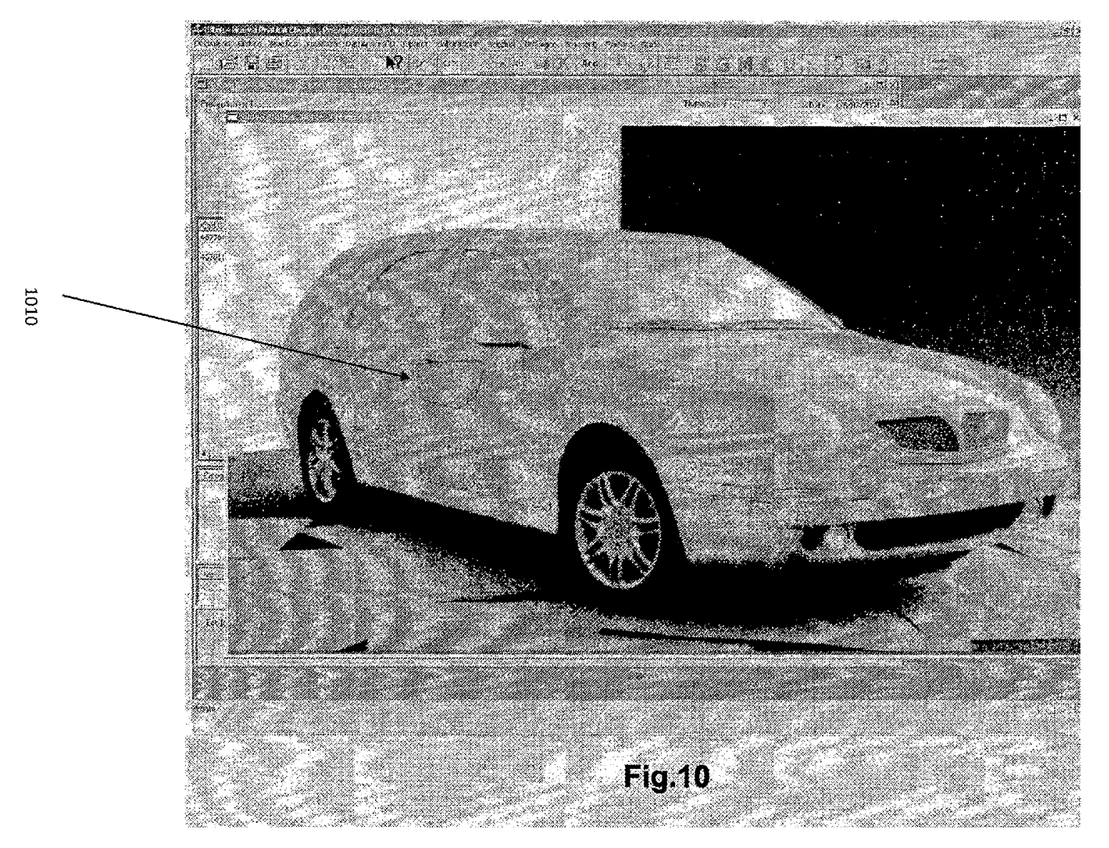

As shown in FIGS. 9 and 10, in exemplary embodiments of the present invention, the program by means of part database and selection, can localize the damage with reference to vehicle parts deformed or otherwise damaged. For instance, as shown in FIGS. 9 and 10 where the work program has identified that the selected damage region extends on both doors of the depicted vehicle and indicates the detected region by, for example, an outline or the like. FIG. 9 shows, at 910, a large black outline providing the perimeter of an identified section of the front passenger door and part of the rear passenger door that has been damaged.

FIG. 10, at 1010, similarly shows a smaller outlined region covering both passenger doors.

Therefore the program can generate and associate with each vehicle part affected by the deformation or damage a severity degree of the deformation, proportional to the deformation itself, that is to the size and/or area and/or volume of the damaged part. Vehicle part database can also be provided with an additional time and/or cost database for repairing and replacing parts, and thus the system by which the program estimates cost and operations needed to rebuild the part can do so by comparison with a time and cost database of motor vehicle parts.

Time and cost estimation can preferably be divided into three steps: (i) sheet metal reparation, or sheet metal working, (ii) painting and (iii) part assembling/disassembling. The time and cost database of motor vehicle parts for each motor vehicle part can preferably have a minimum estimation and a maximum estimation of time and/or cost needed for (i) repairing sheet metal, or sheet metal working, (ii) painting and/or (iii) part assembling/disassembling, and for each motor vehicle part it can also have a list of parts to be disassembled/reassembled for disassembling/reassembling each single part.

Thus the system associates with each damaged part a time and/or cost estimation, preferably divided in said three steps (sheet metal reparation, or sheet metal working, painting and part assembling/disassembling), said estimation being self chosen, by means of dedicated algorithms, in a range from said minimum estimation to said maximum estimation of necessary time and/or cost in a proportional way to the degree of severity of deformation or damage assigned to each part.

Therefore the system sums costs/times needed for the three steps of each damaged vehicle part and it shows the obtained results by means of a result displaying unit, preferably a monitor.

For each damaged part the system compares said cost/time sum needed for the reparation with cost/time needed for completely replacing said damaged part with a new one, and preferably automatically chooses whether (a) to replace said damaged or deformed part or (b) to repair the same part by choosing the lowest cost/time. Even in this case the system shows the obtained results by means of a result displaying unit, eventually asking the operator for a confirmation of the preferred choice.

As shown in FIG. 1, it is also possible to provide a system connected to a database of motor vehicle parts in a warehouse so that the system compares parts to be replaced with parts in the warehouse, producing a report with available parts/not available parts and eventually producing an order (by paper or electronically) for supplying the warehouse with parts taken for replacement and/or parts not available.

The invention claimed is:

1. A process for identifying, analysing and estimating deformations in motor vehicles, comprising:
   loading image data relevant to at least a three-dimensional image of a damaged vehicle in a vehicle image memory;
   accessing image data of at least a three-dimensional image of a sample vehicle from a database of sample vehicle images, said sample vehicle image being the image of a vehicle type corresponding to the damaged vehicle type;
   displaying image data relevant to the damaged vehicle and to the corresponding sample vehicle type;
   automatically comparing said three-dimensional image of the damaged vehicle with the corresponding three-dimensional image of the sample vehicle and (i) identifying damage location or deformation and (ii) detecting deformed regions by visually comparing both images;
   indicating one or more of said damaged or deformed regions on at least one of the two images, said indicating including at least one of highlighting and delineation;
   storing image data corresponding to said damaged or deformed regions of said damaged vehicle;
   computing one or more of perimeter, area, volume and further morphologic parameters of said damaged or deformed region or regions;
   identifying a spatial location of said vehicle damage operating on one or more of the deformed regions and the results of said comparison; and
   computing labor times and costs for repairing the damaged or deformed regions, based at least in part on (i) said computed one or more of perimeter, area, volume of damaged or deformed region or regions and further morphologic parameters, and (ii) a database or repair times and costs.

2. Process according to claim 1, wherein the determination of the damaged region is carried out semi-automatically by an operator.

3. Process according to claim 1, wherein the damaged or deformed regions in displayed images are selected by drawing a close boundary line surrounding a vehicle image region coinciding with a damaged region and by tagging pixels within said boundary line as corresponding to a damaged or deformed region of vehicle.

4. Process according to claim 1, wherein comparison between the damaged vehicle and the sample vehicle is carried out automatically.

5. Process according to claim 4, wherein in automatic mode a comparison is made between image of damaged vehicle and image of sample vehicle, and damaged and/or deformed regions of said damaged vehicle being identified by differences between to damaged vehicle image and image data relevant to sample vehicle image.

6. Process according to claim 4, wherein the selection of sample vehicle image from a database of sample vehicle images is carried out automatically the image whose image data differ at a minimum extent from image data of damaged vehicle being selected as image of sample vehicle.

7. Process according to claim 4, wherein image data comprise a three-dimensional array, each element of said array being correlated to an image pixel of a two-dimensional image according to a plane passing through said pixel,
and wherein the comparison between image data of damaged vehicle and the comparison between image data of sample vehicle being constituted by comparison of image data that in the two image data arrays have the same location.

8. Process according to claim 4, wherein area and/or volume of image region relevant to vehicle image pixel coinciding with damaged region is computed, which region is determined by selection means and/or by automatically comparing image data of damaged vehicle with image data of sample vehicle.

9. Process according to claim 4, further comprising comparing image data relevant to pixels having the same position in each pixel set composing the image.

10. Process according to claim 9, further comprising computing the area of deformed region and/or deformation volume and/or deformation depth.

11. Process according to claim 4, wherein a virtual image of sample vehicle is produced constituting by the virtual image set of individual structural parts of vehicle forming independent structural units, that is individual vehicle parts, which virtual image can be displayed as image of assembled vehicle or as exploded vehicle image and/or as transparency image of damaged vehicle wherein images of hidden parts are also displayed, each structural part of vehicle being univocally identified by an identification code.

12. Process according to claim 11, wherein at least an external view of the vehicle is defined, various external views of vehicle taken from different sides thereof and/or in perspective and at least an inner view of vehicle, various inner views of vehicle similarly to external views, it being possible to graphically select one or more structural parts of vehicle for identificating thereof as damaged parts or one or more structural parts of vehicle being identified as damaged parts by automatic comparison between virtual images of the sample vehicle and virtual images of the damaged vehicle.

13. Process according to claim 1, wherein the image of the vehicle is produced by scanning means, particularly three-dimensional scanning means.

14. Process according to claim 13, wherein identification, analysis and estimation of the at least one damaged region is carried out automatically by acquiring the three-dimensional virtual image of the damaged vehicle by said scanning means and the comparison of acquired image data with image library data relevant to the sample vehicle.

15. Process according to claim 1, wherein damaged vehicle images and library ones of sample vehicle or vehicles are three-dimensional or vectorial images.

16. Process according to claim 1, wherein the automatic selection of sample vehicle and/or the automatic selection of damaged or deformed region or regions is either confirmed or not confirmed by an operator.

17. Process according to claim 1, wherein when identification/selection/computation of damaged or deformed areas and/or volumes finish a size and/or area and/or volume of damaged regions of a specific vehicle type are stored in the work program.

18. Process according to claim 1, wherein one or more images of the damaged vehicle are acquired from inside the damaged vehicle.

19. Process according to claim 1, wherein image data of at least a portion of structural parts of the sample vehicle are stored as dis-assemble and assemble parts, and displayed in at least one of an assembled state, an exploded state or transparently.

20. Process according to claim 1, wherein the structural part of vehicle is determined by determining the structural part wherein pixels fall coinciding with image regions identified as damaged and/or deformed regions, said structural parts being identified as damaged and/or deformed ones stored in a memory.

21. Process according to claim 1, further comprising providing a database of vehicle parts, each part being identified by a code.

22. Process according to claim 21, further comprising providing a time and/or cost database for repairing and replacing motor vehicle parts.

23. Process according to claim 21, wherein said motor vehicle part database for each motor vehicle part further includes a list of parts to be disassembled/reassembled for disassembling/reassembling each single part.

24. Process according to claim 1, further comprising for each vehicle part affected by the deformation or damage:
generating a degree of severity of the deformation proportional to the at least one of size, area, and volume of the damaged part.

25. Process according to claim 1, wherein for each different part identified as deformed or damaged part providing an estimate of cost and operations needed to rebuild the part itself, by comparison with times and costs database of motor vehicle parts.

26. Process according to claim 25, wherein said time and cost estimation is preferably divided into three steps: sheet metal repair or processing, painting and part assembly/disassembly.

27. Process according to claim 23, wherein to each damaged part a time and/or cost estimation is associated, said estimation being automatically self chosen by said process, in a range of minimum estimation to maximum estimation of needed time and/or cost in proportion to the severity of deformation or damage.

28. Process according to claim 26, wherein the system sums costs/times needed for the three steps of each damaged vehicle part.

29. Process according to claim 28, wherein results are one of printed and displayed on a monitor.

30. Process according to claim 25, wherein said time and cost database of motor vehicle parts for each motor vehicle part has a minimum estimation and a maximum estimation of one or more of time and cost needed for each of sheet metal repair or processing, painting and part assembly/disassembly.

31. Process according to claim 25, wherein for each damaged part the system compares said costs/times sum needed for the repair with costs/times needed for completely replacing said damaged part with a new one.

32. Process according to claim 25, further comprising automatically choosing replacing said damaged or deformed part or repairing the same part based on one of lowest cost, time and some combination of cost and time.

33. Process according to claim 1, further comprising being communicably connected to a database of motor vehicle parts in a warehouse.

34. Process according to claim 33, further comprising comparing parts to be replaced with parts in the warehouse and producing a report with available and not available parts.

35. Process according to claim 33, further comprising producing an order by one of paper and electronically for supplying the warehouse with at least one of parts taken for replacement and parts not available.

\* \* \* \* \*

UNITED STATES PATENT AND TRADEMARK OFFICE
CERTIFICATE OF CORRECTION

PATENT NO. : 8,515,152 B2  
APPLICATION NO. : 11/579934  
DATED : August 20, 2013  
INVENTOR(S) : Fausto Siri It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1809 days.

Signed and Sealed this

Fifteenth Day of September, 2015

Michelle K. Lee  
*Director of the United States Patent and Trademark Office*